United States Patent
Kuo

(10) Patent No.: US 6,931,653 B2
(45) Date of Patent: Aug. 16, 2005

(54) CLAMP MECHANISM FOR AN OPTICAL DISK READING DEVICE

(75) Inventor: Tsung-Jung Kuo, Kaohsiung (TW)

(73) Assignee: Lite-On It Corp. (TW)

( * ) Notice: Subject to any disclaimer, the term of this patent is extended or adjusted under 35 U.S.C. 154(b) by 116 days.

(21) Appl. No.: 10/366,926

(22) Filed: Feb. 14, 2003

(65) Prior Publication Data

US 2003/0198175 A1 Oct. 23, 2003

(30) Foreign Application Priority Data

Apr. 19, 2002 (TW) .......................................... 91205310

(51) Int. Cl.⁷ ............................................ G11B 17/04
(52) U.S. Cl. .................................................... 720/714
(58) Field of Search ............................... 720/706, 714; 360/99.02–99.03, 99.06–99.07

(56) References Cited

U.S. PATENT DOCUMENTS

| | | | | |
|---|---|---|---|---|
| 4,823,214 A | * | 4/1989 | Davis | 360/97.01 |
| 5,204,793 A | * | 4/1993 | Plonczak | 360/97.01 |
| 5,831,790 A | * | 11/1998 | Iftikar et al. | 360/99.12 |
| 5,872,680 A | * | 2/1999 | Patterson et al. | 360/97.02 |
| 6,002,547 A | * | 12/1999 | Nicklos | 360/99.04 |
| 6,333,834 B1 | * | 12/2001 | Iftikar et al. | 360/133 |

* cited by examiner

Primary Examiner—Brian E. Miller
(74) Attorney, Agent, or Firm—Raymond Sun

(57) ABSTRACT

An optical disk reading device has a substrate below which a CD is loaded, a base element fixed to an opening of the substrate, a movable element, a rotation part that movably connects the movable element to the base element in a manner such that the movable element moves rotationally and vertically with respect to the base element, and a clamp coupled to the movable element and extending through the opening of the substrate when the movable element moves with respect to the base element.

4 Claims, 4 Drawing Sheets

CLAMP MECHANISM FOR AN OPTICAL DISK READING DEVICE

BACKGROUND OF THE INVENTION

1. Field of the Invention

The present invention relates to an optical disk reading device, and in particular, a movement mechanism for clamping a compact disk. A compact disk shall be referred to hereinafter as either a "disk" or a "CD".

2. Description of the Prior Art

Optical disk reading devices are becoming increasingly popular as storage media devices. Optical disk reading devices, such as thin-type CD drives, are low in cost and can store large amounts of data having different contents, including music, video, programs, and information data. In fact, the use of thin-type compact disk (CD) players is becoming increasingly popular due to their portability, effectiveness, and small size.

At the present time, there are three types of thin-type CD players that are categorized by the way in which each loads and unloads a CD: a first type having an operable lid, a second type that utilizes a moving tray, and a third type that utilizes suction. Among these three types of disk loading and unloading structures, the disk clamps that are used for clamping the CD in each of the three types are also driven by different mechanisms, even though they all share a common requirement of being as thin as possible.

FIGS. 1 and 2 illustrate two conventional CD players. In both conventional CD players, a CD 1a is positioned on a turntable 10a, and the turntable 10a spins the CD 1a to read data from the CD 1a. In order to secure the CD 1a on the turntable 10a during spinning without the CD 1a becoming detached, a holding device 11a is applied to the CD 1a. In particular, the magnetic force of the holding device 11a (or other external forces) will securely clamp the CD 1a to the turntable 10a during spinning. However, if the holding device 11a is to be clamped against the turntable 10a, there must be a movement mechanism 12a that moves either the holding device 11a down (see FIG. 1), or the turntable 10a up (see FIG. 2), to clamp the CD 1a to the turntable 10a. For example, a movement mechanism 12a can be connected to the holding device 11a via an arm 13a to move the holding device 11a up and down (as shown in FIG. 1), or connected to the turntable 10a via an arm 13a to move the turntable 10a up and down (as shown in FIG. 2).

Unfortunately, the movement mechanism 12a shown in FIGS. 1 and 2 requires the arm 13a to be pivoted in order to accomplish the clamping of a CD 1a. Pivoting motions require large clearances or space to accomodate the pivot of the lengthy arm 13a that connects either the turntable 10a or the holding device 11a. Given the space and height limitations imposed on thin-type CD players, the movement mechanisms 12a shown in FIGS. 1 and 2 are not practical choices for implementation in thin-type CD players.

SUMMARY OF THE DISCLOSURE

It is an object of the present invention to provide a holding mechanism for an optical disk reading device that can effectively clamp a CD on to a turntable.

It is another object of the present invention to provide a holding mechanism for an optical disk reading device that has a sufficiently low profile that enables it to be used in thin-type disk reading devices.

It is yet another object of the present invention to provide a holding mechanism for an optical disk reading device that is simple in construction.

In order to accomplish the objects of the present invention, the present invention provides an optical disk reading device having a substrate below which a CD is loaded, the substrate having an opening. The optical disk reading device further includes a base element fixed to the opening of the substrate, a movable element, a rotation part that movably connects the movable element to the base element in a manner such that the movable element moves rotationally and vertically with respect to the base element, and a clamp coupled to the movable element and extending through the opening of the substrate when the movable element moves with respect to the base element.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Although the principles of the present invention are described below in connection with a suction type CD player, the present invention can be applied to all optical disk reading devices, including but not limited to CD drives, DVD drives, CD/DVD drives, DVD/RW combo drives, car audio drives, etc.

The present invention provides a holding mechanism that has a plurality of spiral grooves that provide rotation in opposite directions within a relatively narrow or thin vertical space to accomplish the effective clamping of a CD on to a turntable.

Figure 1:
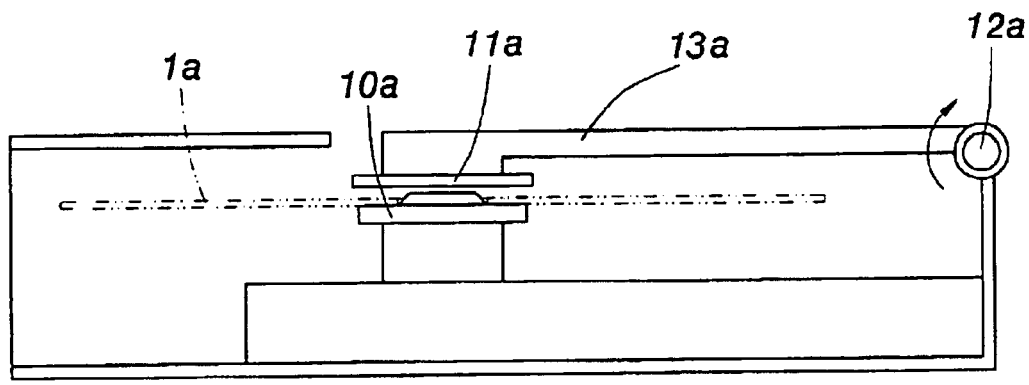
FIGS. 1 and 2 are cross-sectional side views of the clamping of a CD in conventional optical disk reading devices.
Figure 2:
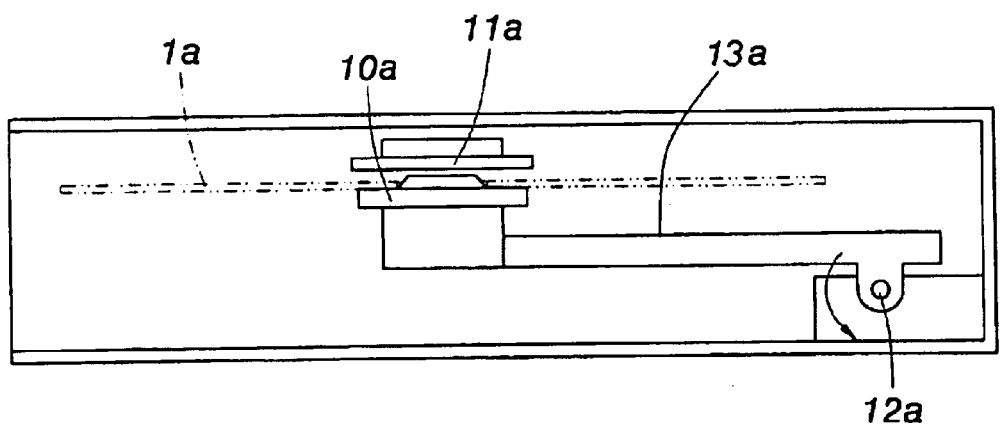
Figure 3:
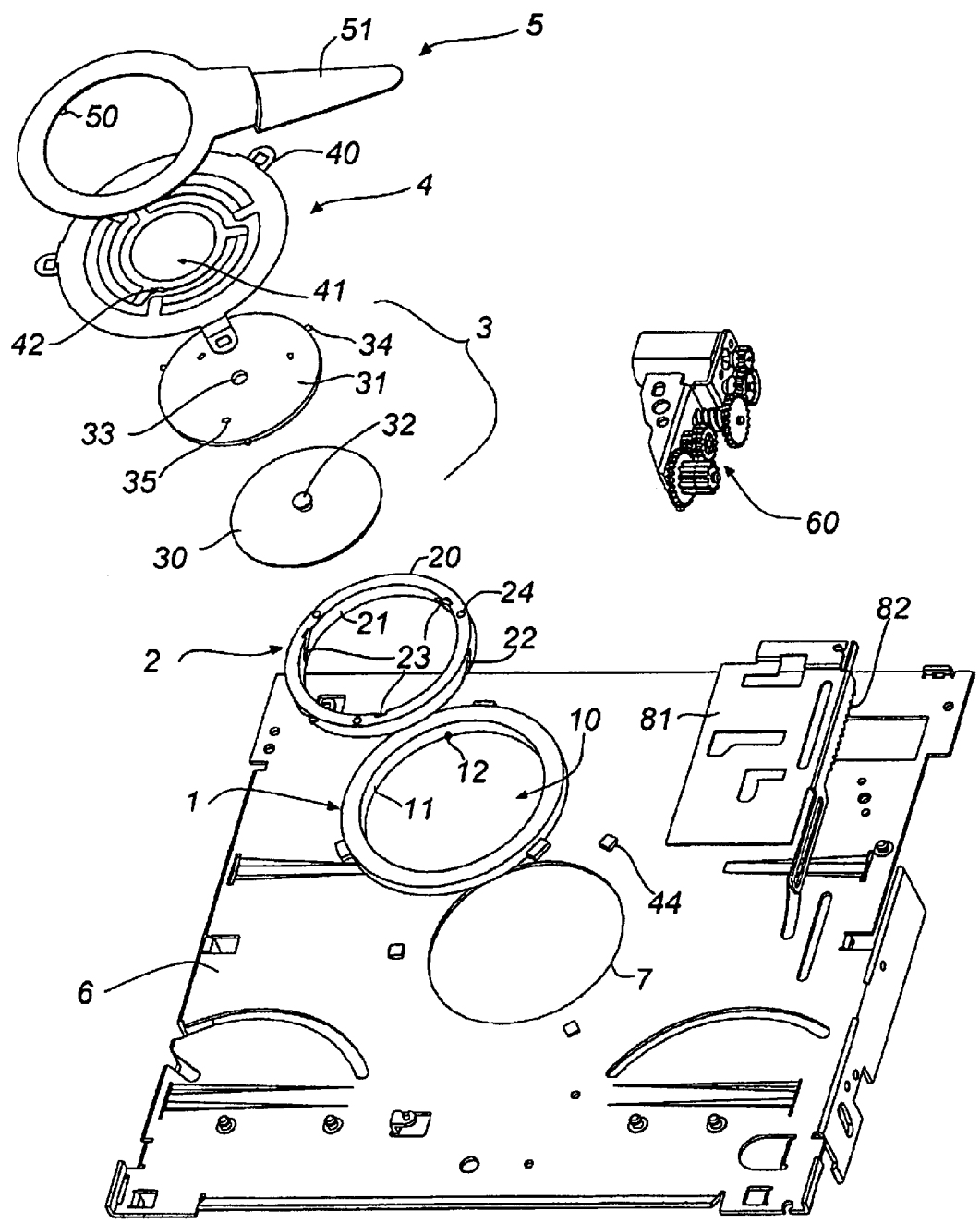
FIG. 3 is an exploded perspective view of a holding device according to one embodiment of the present invention shown in use with a suction-type CD player.
Figure 4:
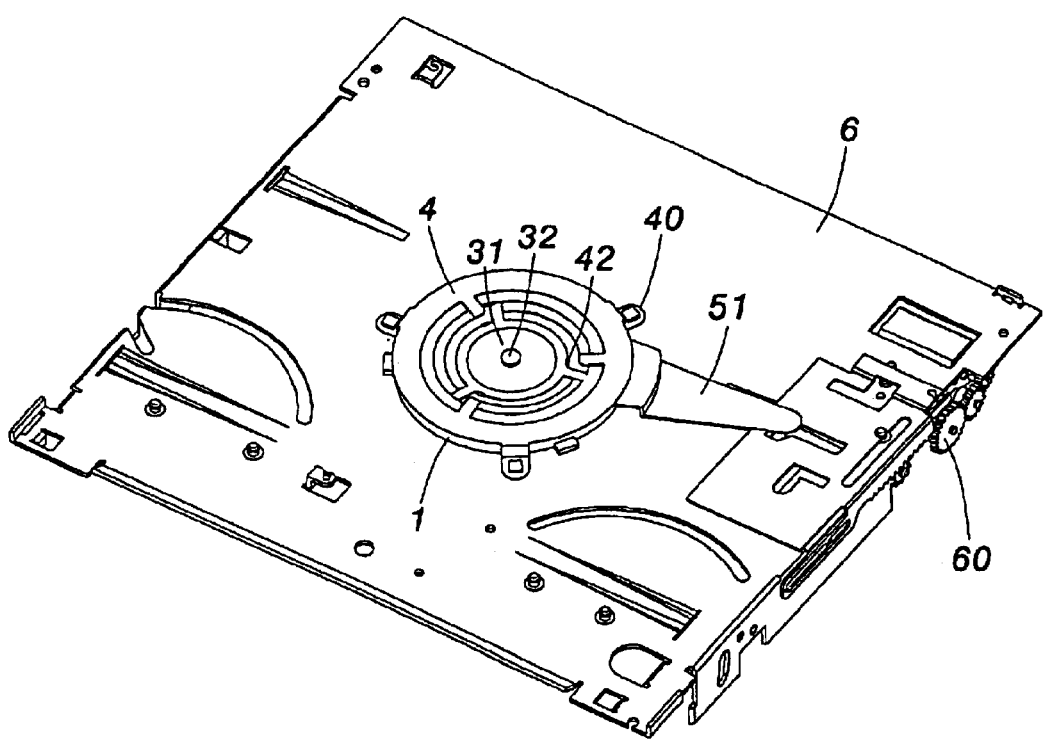
FIG. 4 is a perspective view of the holding device of FIG. 3 shown after it has been assembled.

FIGS. 3 and 4 illustrate one embodiment of a holding device according to the present invention, which has a fixed base ring 1, a rotatable matching ring 2 having a plurality of spiral grooves, a clamp unit 3, an elastic component 4, and a rotation part 5. The base ring 1 is fixed on top of a substrate 6 inside the CD player. The base ring 1 has an opening defined by an inner ring wall 11. The base ring 1 is secured to a central opening 7 in the substrate 6. At least two inner pins 12 (e.g., the embodiment in FIG. 3 utilizes three pins 12) are spaced-apart equidistantly along the inner ring wall 11.

The matching ring 2 is movably coupled to the opening 10 of the base ring 1, and has an outer ring surface 20 and an inner ring surface 21. A plurality of outer spiral grooves 22 are provided in spaced-apart manner along the outer ring surface 20 in a manner such that each outer groove 22 is adapted to receive a corresponding pin 12 from the base ring 1. As a result, the outer pins 12 can travel within the outer grooves 22 in a manner such that the rotatable matching ring 2 can move in a curved and vertical manner with respect to the fixed (i.e., non-rotatable) base ring 1. As an alternative, this spiral (also referred to above as being curved and vertical) motion can be a diagonal motion if the grooves 22 were straight in nature. In addition, at least two inner spiral grooves 23 (e.g., FIG. 3 illustrates three spiral grooves 23) are provided in spaced-apart manner along the inner ring surface 21. The inner spiral grooves 23 extend in curved and vertical (or diagonal) directions opposite to the curved and vertical (or diagonal) directions of the outer spiral grooves 22. Thus, each spiral groove 22 and 23 has a vertical component along the ring surface 20 or 21 as the groove 22 or 23 extends along the ring surface 20 or 21, since the matching ring 2 moves vertically with respect to the base ring 1.

The clamp unit 3 has a clamp 30 and a support 31. A rotation pin 32 extends from the center of the upper surface of the clamp 30 to be received through a hole 33 provided in the center of the support 31 to connect the clamp 30 and the support 31 for pivoting movement between each other. The assembled clamp unit 3 is movably coupled inside the matching ring 2. Outer pins 34 are provided in spaced-apart manner along the peripheral edge of the support 31 in a manner such that each inner groove 23 on the matching ring 2 is adapted to receive a corresponding outer pin 34 from the support 31. As a result, the outer pins 34 can travel within the inner grooves 23 in a manner such that the clamp unit 3 can move in a vertical manner with respect to the rotatable matching ring 2. Similarly, this spiral motion can be a diagonal motion if the grooves 23 were straight in nature.

The elastic component 4 can be embodied in the form of a disk shaped spring, or can be a plate that is made from an elastic material. The outer edge of the elastic component 4 has a plurality of clamping tips 40 which are used for clamping onto connectors 44 provided on the top surface of the substrate 6 of the CD player. In addition, an opening 41 is provided in the center of the elastic component 4 to allow the rotation pin 32 of the clamp unit 3 to extend therethrough. The elastic component 4 also has at least one rotation pin 42 that extends vertically downwardly adjacent the opening 41. Each rotation pin 42 is engaged inside a corresponding slot 35 that is provided on the support 31. Thus, the rotation pin(s) 42 function to fixedly connect the elastic component 4 with the support 31, so as to prevent the support 31 from experiencing radial or lateral movement with respect to the rotation axis defined by the rotation pin 42. In particular, when the matching ring 2 rotates, the rotation pin(s) 42 limits the support 31 to only vertical up-down movement. At the same time, the elasticity of the elastic component 4 functions to maintain continuous pressure on the clamp unit 3.

The rotation part 5 is used to rotate the matching ring 2 in a manner such that the matching ring 2 and the clamp unit 3 can be moved vertically up and down. The rotation part 5 has a central opening, and a plurality of spaced-apart insertion pins 50. Each insertion pin 50 is adapted to be fitted into a corresponding one of a plurality of spaced-apart insertion holes 24 that are provided concavely on a top surface of the matching ring 2 so as to form a single connected unit of the rotation part 5 and the matching ring 2. This connection of the matching ring 2 to the rotation part 5 allows the rotation part 5 to drive and rotate the matching ring 2.

Thus, the rotation part 5 is connected to the matching ring 2 to rotate as a single unit, while the clamp unit 3 and the elastic component 4 are connected together to rotate as a single unit separate from the rotation part 5 and the matching ring 2.

In addition, a crank 51 is provided on one side of the rotation part 5. The crank 51 is connected to a plate 81 which has a rack 82 that is operatively coupled to a gear system 60. Thus, the gear system 60 can be used to rotatively drive the rotation part 5 and the matching ring 2. The gear system 60, the plate 81 and the rack 82, and their operations and functions, are well-known in the art and are not described in further detail herein.

Figure 5:
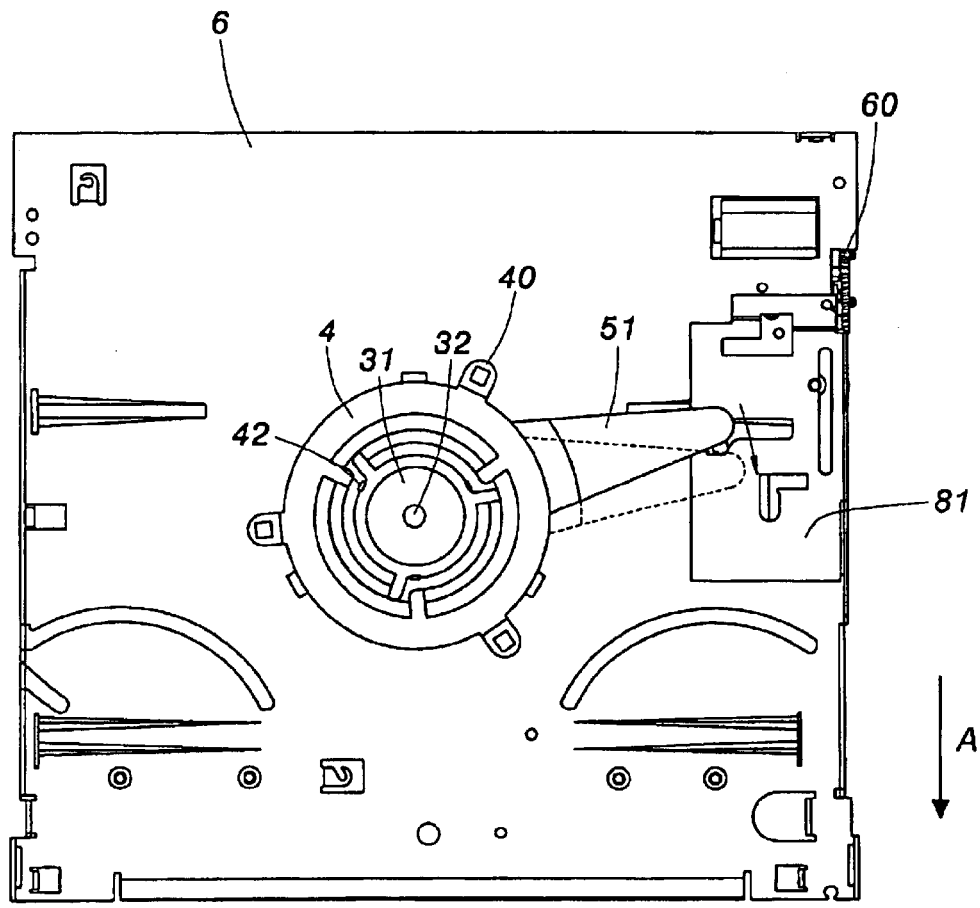
FIG. 5 is a top plan view of the holding device of FIG. 3.

The operation of the present invention shall now be described with reference to FIGS. 3–5. First, as noted above, the matching ring 2 has spiral grooves 22 and 23 which extend in different vertical directions. A CD is typically loaded into the CD player below the substrate 6 so that the central opening of the CD is aligned with the opening 7 in the substrate 6. To clamp the CD, the gear system 60 is actuated so that the gears cooperate with the teeth on the rack 82 to move the plate 81 forwardly in the direction of the arrow A (see FIG. 5). As the plate 81 moves forwardly, it rotates the crank 51 of the rotation part 5 in a clockwise direction (as viewed from the orientation of FIG. 5). As a result, the matching ring 2 (which is connected to the rotation part 5) will also be rotated together with the rotation part 5. At this point, the matching ring 2 is capable of spiral movement with respect to the fixed base ring 1 along the spiral grooves 22, which will translate to a downward vertical movement of the matching ring 2 with respect to the base ring 1. In addition, at this time, the clamp unit 3 is blocked or held by the elastic component 4, so the clamp unit 3 cannot experience rotational movement. However, the clamp unit 3 can experience vertical movement with respect to the matching ring 2 along the spiral grooves 23, because the spiral movement of the matching ring 2 with respect to the support 31 along the spiral grooves 23 will translate to a downward vertical movement for the support 31 relative to its clamp 30.

Thus, since the base ring 1 and the clamp unit 3 are fixed, as the matching ring 2 rotates, the matching ring 2 will draw itself vertically downwardly to be closer to the base ring 1, and the matching ring 2 will also draw the clamp unit 3 vertically downwardly to be closer to itself. This causes the clamp 30 of the clamp unit 3 to be lowered vertically through the openings 10 and 7 in the base ring 1 and the substrate 6, respectively, to clamp the CD. As the crank 51 rotates clockwise, the support 3 moves downwardly with respect to the matching ring 2. In this regard, if the range (i.e., vertical height spanned by each groove) of the opposing spiral grooves 22 and 23 are identical inside the matching ring 2, then the clamp unit 3 can experience at least twice as much movement in the vertical direction. As a result, the clamp unit 3 of the present invention can achieve the dual objectives of effectively clamping a CD and optimizing the use of vertical space inside the CD player, so as to enable it to meet the low-profile demands of a thin-type CD player.

In addition, because the clamp 30 is connected in a pivoting manner to the support 31, when a CD is clamped onto a turntable by the clamp 30, the clamp 30 can rotate together with the movement of the CD while the support 31 can continuously maintain the clamping effect on the CD with the help of the blocking action and the applied pressure of the elastic component 4.

To remove the clamping force of the clamp 30 on the CD, the gear system 60 is actuated to move the rack 82 in a rearward direction opposite to the direction of arrow A. As the plate 81 moves rearwardly, it rotates the crank 51 of the rotation part 5 in a counterclockwise direction (as viewed from the orientation of FIG. 5). As a result, the matching ring 2 (which is connected to the rotation part 5) will also be rotated together with the rotation part 5. At this point, the matching ring 2 is capable of spiral movement with respect to the fixed base ring 1 along the spiral grooves 22, which will translate to an upward vertical movement of the matching ring 2 with respect to the base ring 1. In addition, the clamp unit 3 experiences an upward vertical movement with respect to the matching ring 2 along the spiral grooves 23.

Thus, whether the clamp unit 3 moves up or down with respect to the matching ring 2 depends on the direction of rotation of the matching ring 2.

Thus, the provision of opposing spiral grooves on a moving body (i.e., the matching ring 2) that moves within a fixed base (i.e., the base ring 1) allows the height profile of a clamp 30 to be expanded by twice the height of each groove. This allows the clamp 30 to operate within a very thin or narrow vertical space, while maintaining effective clamping capabilities.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An optical disk reading device, comprising:

a substrate below which a CD is loaded, the substrate having an opening;

a base ring fixed to the opening of the substrate;

a movable ring that is coupled to the base ring in a manner such that the movable ring moves rotationally and vertically with respect to the base ring;

a clamp that is movably coupled to the movable ring, and which extends through the opening of the substrate when the movable ring moves with respect to the base ring;

an elastic component fixedly secured to the clamp and the substrate;

means for movably connecting the movable element to the substrate; and wherein the movable ring has a plurality of first spiral grooves that extend in a first direction, and a plurality of second spiral grooves that extend in a second direction opposite to the first direction, wherein the base ring has a first plurality of pins that are received in corresponding first spiral grooves, and wherein the clamp has a second plurality of pins that are received in corresponding second spiral grooves.

2. An optical disk reading device, comprising:

a substrate below which a CD is loaded, the substrate having an opening and a base ring fixed to the opening;

a movable ring that is coupled to the base ring, the movable ring having a plurality of first grooves that extend in a first direction, and a plurality of second grooves that extend in a second direction opposite to the first direction;

a clamp that is movably coupled to the movable ring, and which extends through the opening of the substrate when the movable ring moves with respect to the base ring;

a rotation part coupled to the movable ring; and an elastic component fixedly secured to the clamp and the substrate.

3. The device of claim 2, wherein the substrate has a first plurality of pins that are received in corresponding first grooves, and wherein the clamp has a second plurality of pins that are received in corresponding second grooves.

4. The device of claim 2, further including a gear system and a plate operatively coupled to the gear system.

* * * * *